United States Patent [19]

Brooks et al.

[11] 4,094,863
[45] June 13, 1978

[54] CROSS-LINKING HYDROCARBON UNSATURATED POLYMER WITH MONO-SULPHONYLOXYCARBAMATE COMPOUNDS

[75] Inventors: John Langshaw Brooks; Richard Budziarek, both of Manchester, England

[73] Assignee: Imperial Chemical Industries Limited, London, England

[21] Appl. No.: 770,569

[22] Filed: Feb. 22, 1977

[30] Foreign Application Priority Data

Feb. 27, 1976 United Kingdom ............... 7809/76

[51] Int. Cl.² ............... C08F 18/24; C08G 18/00; C08C 19/20
[52] U.S. Cl. ............... 260/77.5 B; 260/77.5 BB; 260/79.3 R; 260/79.3 M; 260/769; 560/12; 560/148; 560/13
[58] Field of Search ............... 260/77.5 B, 77.5 BB, 260/769

[56] References Cited

U.S. PATENT DOCUMENTS

| | | | |
|---|---|---|---|
| 3,165,498 | 1/1965 | Bissinger | 260/77.5 BB |
| 3,297,659 | 1/1967 | Breslow et al. | 260/769 |
| 3,592,784 | 7/1971 | Brack | 260/77.5 BB |
| 3,600,359 | 8/1971 | Miranda | 260/77.5 BB |
| 3,809,633 | 5/1974 | Magnotta et al. | 260/77.5 BB |
| 3,965,145 | 6/1976 | D'Angelo et al. | 260/77.5 B |

*Primary Examiner*—Herbert J. Lilling
*Attorney, Agent, or Firm*—Cushman, Darby & Cushman

[57] ABSTRACT

A process for the cross-linking or chain-extension of hydrocarbon polymers which contain ethylenically unsaturated groups which comprises forming an intimate mixture of the polymer with a mono-sulphonyloxycarbamate of the formula:

$$A - O - CO - NH - O - SO_2R \qquad (1)$$

wherein A is an alkyl group, a cycloalkyl group, an alkenyl group, a substituted alkyl group, a substituted aryl group or a heterocyclic group, and R is an optionally substituted alkyl or aryl group.

The process is useful for natural and synthetic rubbers. The rate and extent of cross linking may be modified by the additives such as tertiary amines or conventional rubber additives e.g. tetramethyl and zinc diethyl dithiocarbamates, which contain tertiary amino groups.

4 Claims, No Drawings

CROSS-LINKING HYDROCARBON UNSATURATED POLYMER WITH MONO-SULPHONYLOXYCARBAMATE COMPOUNDS

This invention relates to a process for the cross-linking or chain-extension of polymers containing olefinically-unsaturated groups and to monosulphonyloxycarbamates of value for this purpose.

According to the invention there is provided a process for the cross-linking or chain-extension of hydrocarbon polymers which contain ethylenically unsaturated groups which comprises forming an intimate mixture of the polymer with a mono-sulphonyloxy carbamate of the formula:

$$A-O-CO-NH-O-SO_2R \quad (1)$$

wherein A is an alkyl group, a cycloalkyl group, an alkenyl group, a substituted alkyl group, a substituted aryl group or a heterocyclic group, and R is an optionally substituted alkyl or aryl group.

As examples of groups which may be represented by A there may be mentioned alkyl groups, such as methyl, ethyl, isopropyl, but more especially those containing at least 4 and up to 20 carbon atoms, e.g. n-, i-, s- and t-butyl, hexyl, octyl, capryl, decyl, lauryl, myristyl, cetyl and stearyl, cycloalkyl groups such as cyclohexyl, alkenyl groups such as vinyl, allyl, butenyl and oleyl, substituted alkyl groups such as aralkyl groups, e.g. benzyl or phenyl ethyl; and alkyl groups carrying other aromatic, e.g. phenolic or arylamine residues attached directly or through linking groups, optionally substituted aryl groups such as alkylphenyl e.g. nonylphenyl, alkenylphenyl, hydroxyaryl, especially 3,5-dialkyl, e.g. t-butyl-4-hydroxyphenyl.

As optionally substituted alkyl or aryl groups which may be represented by R, there may be mentioned alkyl groups preferably containing from 1 to 4 carbon atoms such as ethyl, n- and isopropyl, n-butyl, and especially methyl, but also n-octyl, n-decyl, n-dodecyl and n-octadecyl, and substituted derivatives of these, e.g. halogenoalkyl e.g. trichloromethyl, β-chloroethyl, and aryl groups such as phenyl and o-, m- and p-tolyl and substituted aryl especially substituted phenyl groups such as chlorophenyl and nitrophenyl.

The sulphonyloxyurethanes of formula (1) can be obtained by reacting a hydroxycarbamate of the formula:

$$A-O-CO-NH-OH \quad (2)$$

with one mole of a sulphonyl chloride of the formula:

$$R-SO_2Cl \quad (3)$$

the symbols A and R having the meanings stated above, in the presence of an acid-binding agent which is added at a rate sufficient to neutralise the mineral acid formed whilst keeping the pH of the mixture below 7. The process is preferably carried out by mixing the hydroxycarbamate and the sulphonyl chloride, preferably in an inert solvent, e.g. dioxan, and adding the acid-binding agent at such a rate that the pH of the mixture is maintained at below 7. The reaction is preferably carried out at a temperature below 20° C, more especially from 0° to 5° C.

As examples of sulphonyl chlorides of formula (3) which may be used in the above process, there may be mentioned:
methane sulphonyl chloride,
benzene sulphonyl chloride,
p-tolyl sulphonyl chloride,
m- and p-nitrobenzene sulphonyl chlorides and
α- or β-naphthalene sulphonyl chlorides.

The hydroxycarbamates of formula (2) used in the above process can be obtained by reacting a hydroxyl compound of the formula A—OH with phosgene to form a chloroformate of the formula A—O—CO—Cl and reacting the latter with hydroxylamine.

As examples of hydroxyl compounds of formula A—OH which may be used, there may be mentioned:
methanol
ethanol
n- and iso-propanol
n- and t-butanol
n-hexanol
n-octanol
n-nonanol
n-decanol
dodecanol
tridecanol
hexadecanol
octadecanol
alkenols, e.g.
vinyl alcohol
allyl alcohol
2-butenyl alcohol
oleyl alcohol
β-(3,5-di-t-butyl-4-hydroxyphenoxy)ethanol
benzyl alcohol
phenols and dihydroxybenzenes, e.g.
4-hydroxymethyl-2,6-di-t-butyl phenol
2,6-di-t-butyl hydroquinone.

As examples of polymers which may be cross-linked or chain-extended in accordance with the invention there may be mentioned natural and synthetic polyisoprene and other isoprene-containing copolymers, polybutadiene and butadiene copolymers.

The carbamates of formula (1) may be incorporated into the polymer by blending with the polymer in any conventional manner, for example on a two-roll mill. The polymer is thereafter shaped, for example in a mould, and heated to a temperature above 50° C, and preferably between 100° and 250° C, to bring about cross-linking.

The polymer mixtures may also contain other conventional additives; as examples of such additives, there may be mentioned fillers, e.g. silica, carbon black, diatomaceous earths, pigments, antioxidants, curing accelerators and anti-scorch agents.

In particular, the rate or extent of cross-linking can be modified by addition of tertiary amines, or additives of the above kind which contain tertiary amino groups — e.g. tetramethyl-thiourea or zinc diethyl dithiocarbamate.

The amount of carbamate of formula (1) used will normally be from 0.1 part to 10 parts by weight per 100 parts by weight of the polymer; the use of other proportions however is possible.

The invention is illustrated by the following Examples in which parts and percentages are by weight.

EXAMPLE 1

2.5 Parts of ethyl p-nitrobenzenesulphonyloxyurethane and 5 parts of triethylamine are added to a solution of 15 parts of cis-polyisoprene in 150 parts of 1,2-dichloroethane.

The mixture is stirred at 75° C for 18 hours and 200 parts of methanol are added. The precipitated rubber is allowed to dry under ambient conditions.

Examination of the product by I.R. spectroscopy shows an absorption bond at 5.75 microns, consistant with a rubber bound methane group.

EXAMPLE 2

Natural rubber—Standard Malaysian Rubber 5—(15 parts) was treated as described for synthetic cis polyisoprene in Example 1, with similar results.

EXAMPLES 3-9

A masterbatch made by mixing solution polymerised SB Rubber (Solprene 1204) and high abrasion furnace black (N 330) in the ratio 2:1 by weight were mixed with the curatives:

| | |
|---|---|
| Masterbatch | 150 |
| Carbamate | 4 |
| Zinc diethyl dithiocarbamate (ZDC) | 0 or 4 |

The compounded stocks were tested for cross-linking activity using an Oscillating Disc Rheometer at 190° C. The results are given in Table 1.

Table 1

| Ex. | Carbamate | Peak Torque (lb.) | Time to 95% peak torque (mins) |
|---|---|---|---|
| 3 | nonyl-N-(benzenesulphonyloxy) carbamate | 26 | 23 |
| 4 | + ZDC | 53 | 2.5 |
| 5 | ethyl-N-(p-nitrobenzenesulphonyloxy)carbamate | 26 | 56 |
| 6 | + ZDC | 78 | 3.5 |
| 7 | ethyl-N-[2-(triethylammonium-carboxy)benzene-sulphonyloxy] carbamate | 30 | 50 |
| 8 | ethyl-N-(phenylsulphonyloxy) carbamate | 18 | 30 |
| 9 | + ZDC | 91 | 2.5 |

A sulphur curing system containing:

| | |
|---|---|
| Masterbatch | 150 |
| N-cyclohexyl-2-benzthiazylsulphenamide | 1.2 |
| sulphur | 1.8 |
| zinc oxide | 5.0 |
| stearic acid | 1.0 | gave a peak torque of 95 lb. with a time of 4 mins. to 95% peak torque value.

EXAMPLE 10

A compounded stock was made up and tested as in Example 3, except that natural rubber was used in place of SBR.

A peak torque of 30 lb. with a time of 36 mins to 95% peak torque value was obtained.

EXAMPLES 11-16

The procedure described for Examples 3-9 was repeated using the sulphonyloxycarbamates described in Table 2; the Peak Torque and time to 95% peak torque are given in columns 3 and 4.

Table 2

| Example | Carbamate | Peak Torque (lb.) | Time to 95% peak torque (mins.) |
|---|---|---|---|
| 11 | butyl-N-(p-toluenesulphonyloxy)carbamate | 21.5 | 13 |
| 12 | + ZDC | 76.5 | 2.3 |
| 13 | benzyl-N-(p-toluenesulphonyloxy)carbamate | 20 | 14.3 |
| 14 | + ZDC | 54 | 2.6 |
| 15 | phenyl-N-(p-toluenesulphonyloxy)carbamate | 26 | 15 |
| 16 | + ZDC | 52 | 1.8 |

The compounds of formula (1) in which R is phenyl or p-tolyl and A is alkyl of $C_4$ or greater, e.g. $C_4$-$C_{20}$, phenyl or benzyl, are believed to be novel and form a further feature of the invention; they may be obtained by reacting a N-hydroxycarbamate of the formula A—O—CO—NH—OH where A has the meaning just stated, with benzene- or p-toluene-sulphonyl chloride, in the presence of an acid-binding agent.

This aspect of the invention is illustrated by the following Examples:

EXAMPLE 17

396 Parts of nonyl alcohol are reacted with phosgene to give 558 parts of nonyl chloroformate as a colourless liquid b.p. 70°-72° C/1 mm.

206.5 Parts of this product are reacted with hydroxylamine to give 190 parts of nonyl-N-hydroxycarbamate as a colourless oil.

Found: C, 58.3%; H, 10.3%; N, 6.8%. $C_{10}H_{21}NO_3$ requires: C, 59.2%; H, 9.9%; N, 6.9%.

20.4 Parts of triethylamine are added to a stirred mixture of 40.6 parts of nonyl-N-hydroxycarbamate, 100 parts of dioxan and 35.3 parts of benzene sulphonyl chloride at 0° C keeping the pH in the range 2 to 5. The mixture is stirred for 18 hours at 25° C then added to 500 parts of water. The oily product is separated into 300 parts of toluene and the solution is washed with water, dried and evaporated at 40° 1 C under reduced pressure to give 72 parts of nonyl-N-benzenesulphonyloxycarbamate as a colourless oil.

Found: C, 59.9%; H, 8.1%; N, 4.1%. $C_{16}H_{24}NO_4S$ requires: C, 58.9%; H, 7.4%; N, 4.3%.

EXAMPLE 18

324.4 Parts of benzyl alcohol are reacted with phosgene to give 505 parts of benzyl chloroformate as a colourless liquid b.p. 78° C/2.0 mm.

170.5 Parts of this product are reacted with hydroxylamine to give 149 parts of benzyl N-hydroxycarbamate as a waxy solid.

20.4 Parts of triethylamine are added slowly to a stirred mixture of 33.4 parts of benzyl N-hydroxycarbamate, 100 parts of methylene dichloride and 38.1 parts of p-toluene sulphonyl chloride at 0° C, keeping the pH in the range 2 to 5. The mixture is stirred for 18 hours at 25° C then washed with 300 parts of water, dried, filtered and methylene dichloride distilled off at 30° C under reduced pressure to give 39 parts of benzyl N-p-toluene sulphonyl oxycarbamate as a yellow crystalline solid, m.p. 82° C.

Found: C, 56.0%; H, 4.7%; N, 5.4%. $C_{15}H_{15}NO_5S$ requires: C, 56.1%; H, 4.7%; N, 4.4%.

EXAMPLE 19

20.4 Parts of triethylamine are added to a stirred mixture of 30.4 parts of phenyl N-hydroxycarbamate, 100 parts of dioxan and 38.1 parts of toluenesulphonylchloride at 0° C, keeping the pH in the range 2 to 5. The mixture is then stirred for 18 hours at 25° C and added to 500 parts of water. The oily precipitate is taken up in 500 parts of toluene and the solution is washed with water, dried, filtered and evaporated to constant weight at 40° C under reduced pressure to give 59 parts of phenyl N-p-toluenesulphonyloxycarbamate as a yellow oil.

EXAMPLE 20

Repetition of the method of Example 18 using 35.3 parts of benzene sulphonylchloride instead of 38.1 parts of toluenesulphonyl chloride afforded 39.5 parts of phenyl N-benzenesulphonyloxycarbamate, as a viscous oil.

Found: C, 53.4%; H, 3.9%; N, 3.8%; S, 10.6%. $C_{13}H_{11}NO_5S$ requires: C, 53.2%; H, 3.8%; N, 4.7%; S, 10.9%.

EXAMPLE 21

26.6 Parts of butyl N-hydroxycarbamate and 38.1 parts of p-toluenesulphonylchloride are stirred in 100 parts of dioxan maintained at 0° to 5° C. 20.4 Parts of triethylamine are added during 1 hour keeping the pH at 3 to 6. The mixture is then stirred for 18 hours at 25° C and added to 500 parts of water. The oily precipitate is taken up into 200 parts toluene, and the solution is dried, filtered and evaporated to constant weight at 40° C under reduced pressure to give 52 parts of butyl N-p-toluenesulphonyloxycarbamate as a yellow oil.

Found: C, 50.9%; H, 6.3%; N, 4.3%. $C_{12}H_{17}NO_5S$ requires: C, 50.2%; H, 5.9%; N, 4.9%.

EXAMPLE 22

20.4 Parts of triethylamine are added slowly to a stirred mixture of 26.6 parts of butyl N-hydroxycarbamate, 100 parts of methylene dichloride and 35.3 parts of benzene sulphonylchloride at 0° C at such a rate as to keep the pH in the range 2 to 5. After a further 18 hours stirring at a temperature of 25° C the mixture is washed with 300 parts of water, dried, filtered and methylene chloride distilled off at 30° C under reduced pressure to give 38.3 parts of butyl N-benzenesulphonyloxycarbonate as a yellow oil.

What we claim is:

1. A process for the cross-linking of hydrocarbon polymers which contain ethylenically unsaturated groups which comprises forming an intimate mixture of the polymer with a mono-sulphonyloxycarbamate of the formula:

$$A - O - CO - NH - O - SO_2R \qquad (1)$$

wherein A is an alkyl group, a cycloalkyl group, an alkenyl group, a substituted alkyl group, a substituted aryl group or a heterocyclic group, and R is an optionally substituted alkyl or aryl group and heating the mixture at a temperature within the range 50° to 250° C.

2. A process as claimed in claim 1 wherein R is phenyl or p-tolyl.

3. A process as claimed in claim 1 wherein A is alkyl of 4–20 carbon atoms, benzyl or phenyl.

4. A process as claimed in claim 3 which is carried out in the presence of an additive containing a tertiary amino group.

* * * * *